United States Patent [19]
Jordan

[11] 3,758,958
[45] Sept. 18, 1973

[54] WHEEL ALIGNING APPARATUS
[75] Inventor: William I. Jordan, Belgium, Wis.
[73] Assignee: Performance Equipment Inc., Milwaukee, Wis.
[22] Filed: Apr. 28, 1970
[21] Appl. No.: 32,508

[52] U.S. Cl............. 33/336, 33/203.15, 33/203.18
[51] Int. Cl. ............................................ G01b 5/24
[58] Field of Search............ 33/203, 203.18, 203.12, 33/203.13, 203.14, 203.2, 203.15

[56] References Cited
UNITED STATES PATENTS

| | | | |
|---|---|---|---|
| 2,603,881 | 7/1952 | Holaday............................ | 33/203.15 |
| 2,765,540 | 10/1956 | MacMillan et al............ | 33/203.15 X |
| 3,409,991 | 11/1968 | Davis et al.................... | 33/203.18 X |
| 2,378,631 | 6/1945 | Holmes............................ | 33/203.12 |
| 3,023,511 | 3/1962 | Castiglia ......................... | 33/203.12 |
| 3,457,653 | 7/1969 | Dick ............................. | 33/203.18 X |

Primary Examiner—William D. Martin, Jr.
Attorney—Robert E. Clemency, John W. Michael, Gerrit D. Foster, Spencer B. Michael, Bayard H. Michael, Paul R. Puerner, Joseph A. Gemignani and Andrew O. Riteris

[57] ABSTRACT

Disclosed herein is a wheel aligning apparatus for selectively measuring "camber", "caster", and "toe" conditions, which apparatus includes means adapted to be connected to a wheel and a measuring circuit including a sensor mounted on said means and including means variably passing current in accordance with the position of the sensor. The circuit also includes means for supplying alternating current thereto, means for measuring current flow from the sensor, camber, caster, and toe resistors in parallel electrical connection, and switch means connected to said camber, caster, and toe resistors for selectively connecting any one of the resistors in operative electrical connection in the circuit and for simultaneously disconnecting the other two of said resistors from the circuit. The aligning apparatus also includes a mounting arm supporting the sensor and means connecting the mounting arm to a tire clamp for affording pivotal movement of the mounting arm relative to the tire clamp about an axis transverse to the wheel axis.

22 Claims, 11 Drawing Figures

PATENTED SEP 18 1973
3,758,958
SHEET 1 OF 3
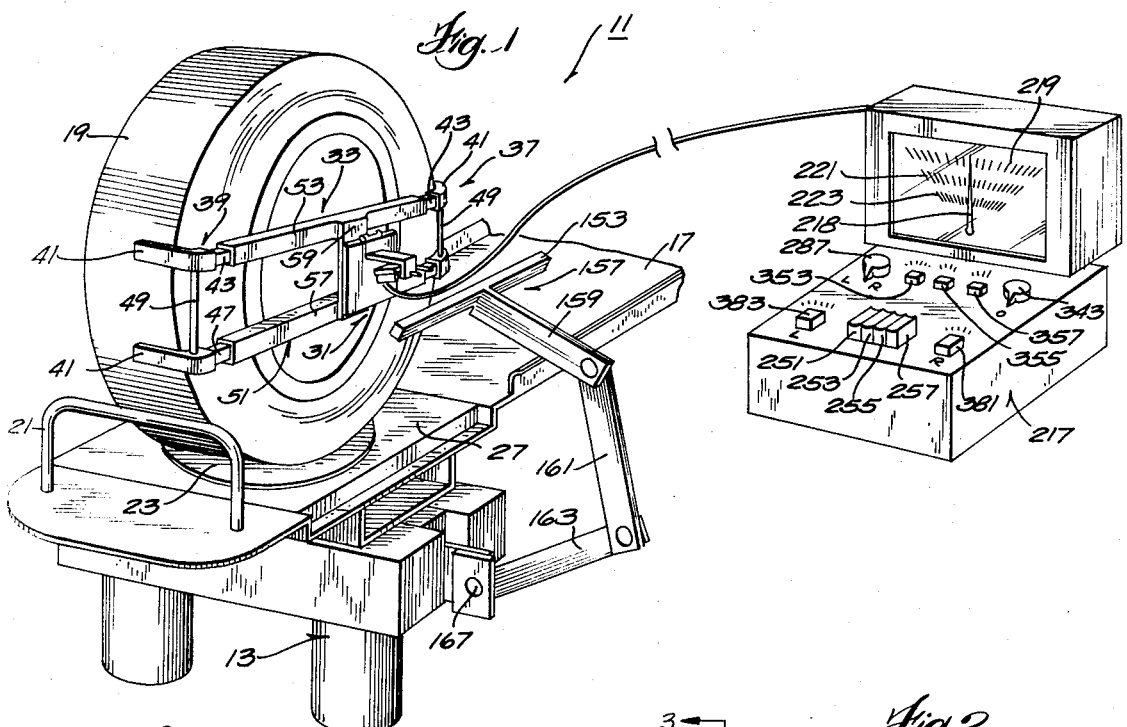
Fig. 1
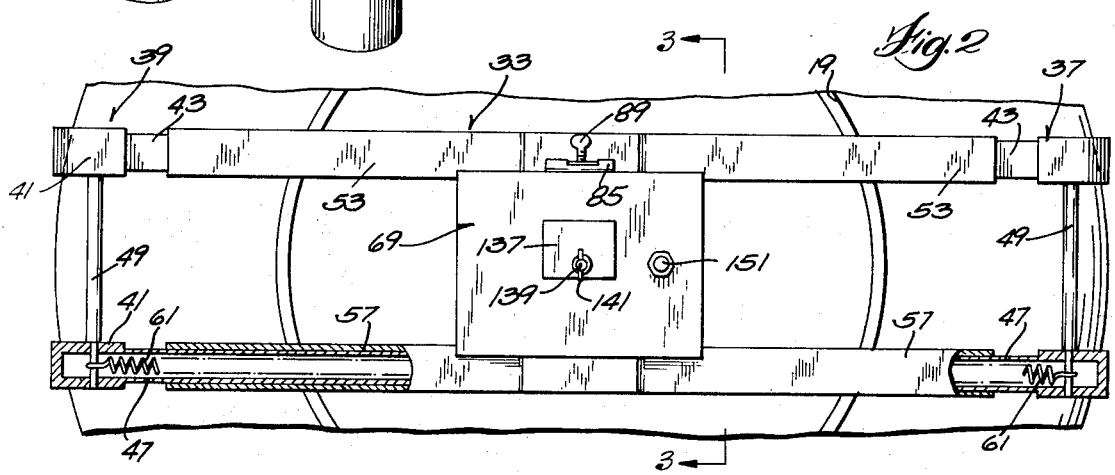
Fig. 2
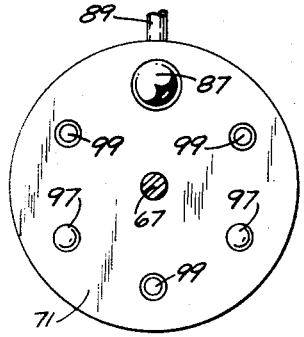
Fig. 5
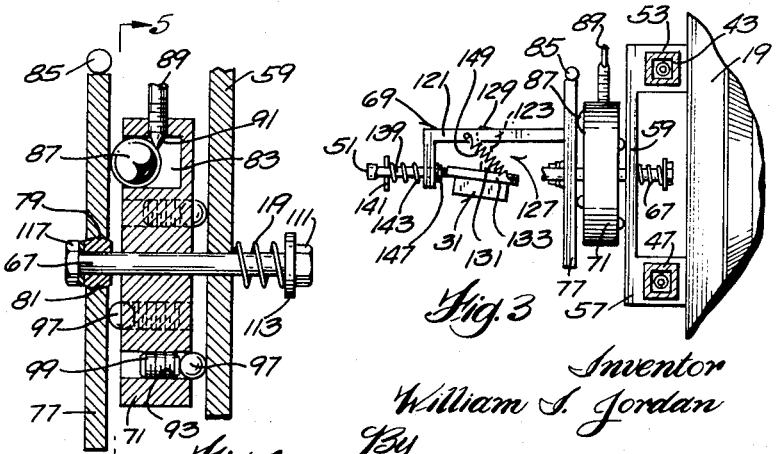
Fig. 4
Fig. 3
Inventor
William J. Jordan
By
Wheeler, Wheeler, House & Clemency
Attorneys Inventor
William S. Jordan
By
Whelen, Whelen, House & Clemency
Attorneys

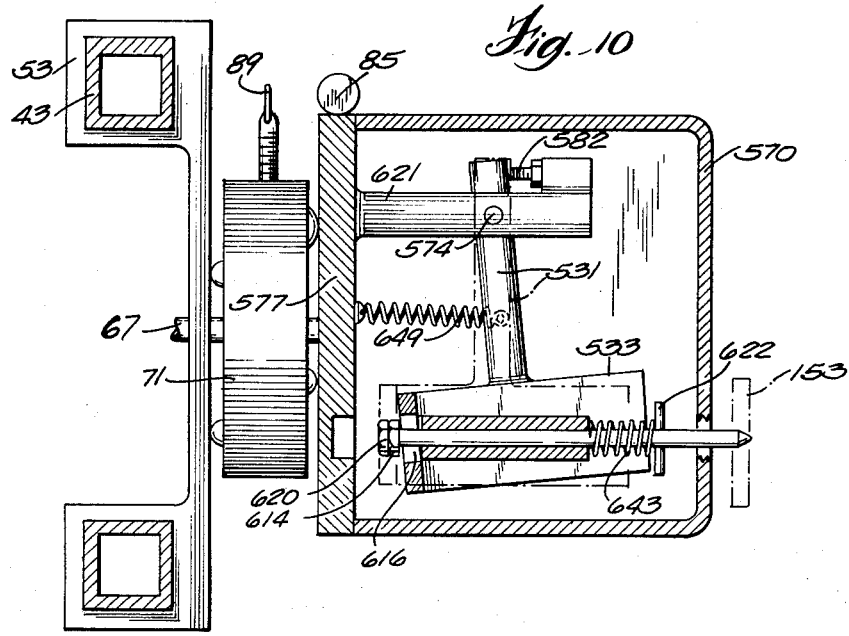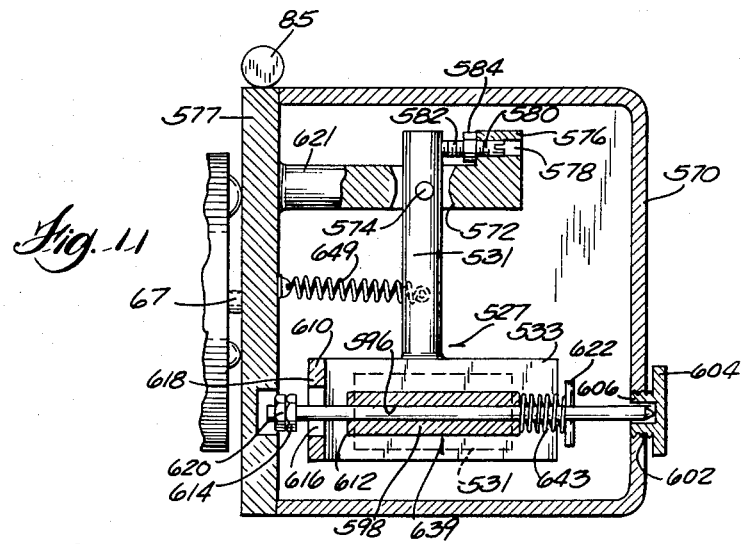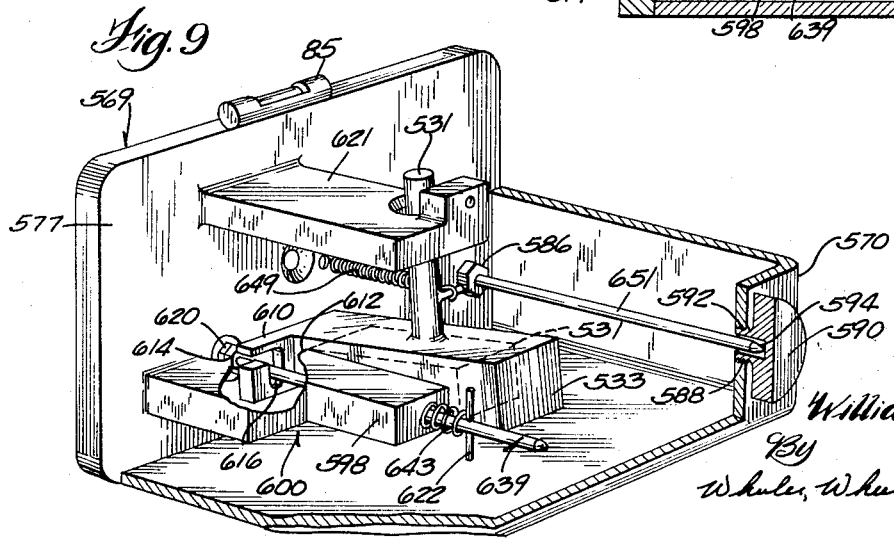

WHEEL ALIGNING APPARATUS

BACKGROUND OF THE INVENTION

The invention relates generally to front wheel aligning and particularly to apparatus for measuring "camber", "caster", and "toe" conditions of automobile front wheels which are supported for steering by conventional means from a conventional A frame.

As used herein, camber refers to a condition of a wheel with reference to a fore and aft plane when looking from the front. Toe refers to a condition of a wheel with reference to a fore and aft plane when looking from above. Caster refers to the condition of the steering axis of a wheel when compared between a first position with the wheel turned in 20° from a forward track and a second position with the wheel turned out 20° from a forward track.

Reference is hereby made to the Davis et al. U.S. Pat. No. 3,409,991, to the MacMillan et al. U.S. Pats. Nos. 2,765,540 and 2,923,067, to the Dick U.S. Pat. No. 3,457,653, to the Martin U.S. Pat. No. 2,777,211, and to the Cady et al. U.S. Pats. Nos. 3,465,580 and 3,305,935.

SUMMARY OF THE INVENTION

The invention provides an electrical circuit including a single sensing device and a single measuring instrument, together with an associated mechanical linkage for measuring camber, caster, and toe conditions. The invention involves the provision of a circuit having switching means for selectively electrically connecting separate resistances in a circuit having a single sensing device and measuring instrument.

As a matter of convenience, the invention also involves the use of two sensors, one for each front wheel, together with a single measuring device and suitable switching means in a measuring circuit.

The invention also provides an arrangement for mounting, on the front wheel of an auto, a sensor or device for sensing an out-of-horizontal condition and for passing electrical current which varies in value in accordance with the out-of-horizontal condition of the sensor.

More particularly, the invention provides a tire clamp having a sensor carrying a mounting arm which is adjustably mounted for pivotal movement about a universal joint, and particularly for pivotal movement about an axis transverse to the wheel axis.

The invention further provides an arrangement in which the sensor is mounted relative to the mounting arm for movement about an axis transverse to the wheel axis so as to enable toe measurements. In this regard, the sensor is biased into engagement with a plunger mounted from a part of a sensor support arm for movement which is effective to tilt the sensor relative to the support arm. The plunge is also biased into a position reflecting a maximum "out-of-toe" condition and is moved toward the sensor to tilt the sensor about its axis in response to engagement with a toe bar which also cooperates with a stop located so as to cooperate with the plunger in measuring toe.

Still more particularly, the plunger is displaced in response to engagement by a toe bar until toe bar movement is limited by the stop. The degree to which the sensor is rocked by the consequent plunger movement is utilized to determine the degree of toe condition.

The invention also involves an arrangement whereby toe measurements can be simply made by the same sensor which is employed to measure camber and caster conditions.

One of the principal objects of the invention is the provision of a wheel aligning apparatus which is simple and economical to construct, which is simple and efficient to operate, and which will provide a long and reliable life.

Another principal object of the invention is the provision of a wheel aligning apparatus including a single measuring device arranged in a circuit so as to selectively obtain camber, caster, and toe measurements.

Another particularly important advantage of the invention is the adaptability of the disclosed arrangement for assisting alignment of the rear wheels of certain automobiles, such as the "Corvair" which has, in the past, been manufactured by General Motors Corp.

Other objects and advantages of the invention will become known by reference to the following description and accompanying drawings.

DRAWINGS

FIG. 1 is a fragmentary perspective view of a wheel aligning apparatus embodying various of the features of the invention.

FIG. 2 is an enlarged fragmentary view, partially in section, illustrating the tire clamp and attached sensor mounting arm embodied in the apparatus shown in FIG. 1.

FIG. 3 is a view, partially in section, taken generally along line 3—3 of FIG. 2.

FIG. 4 is an enlarged fragmentary view in section of a portion of the device shown in FIG. 3.

FIG. 5 is a sectional view taken along line 5—5 of FIG. 4.

FIG. 9 is a fragmentary perspective view, partially broken away and in section, of another embodiment of a portion of the apparatus shown in FIG. 1.

FIG. 10 is a view, partially in section, including the apparatus shown in FIG. 9.

FIG. 11 is a view similar to FIG. 10, with the parts shown in somewhat different position.

GENERAL DESCRIPTION

Figure 8:
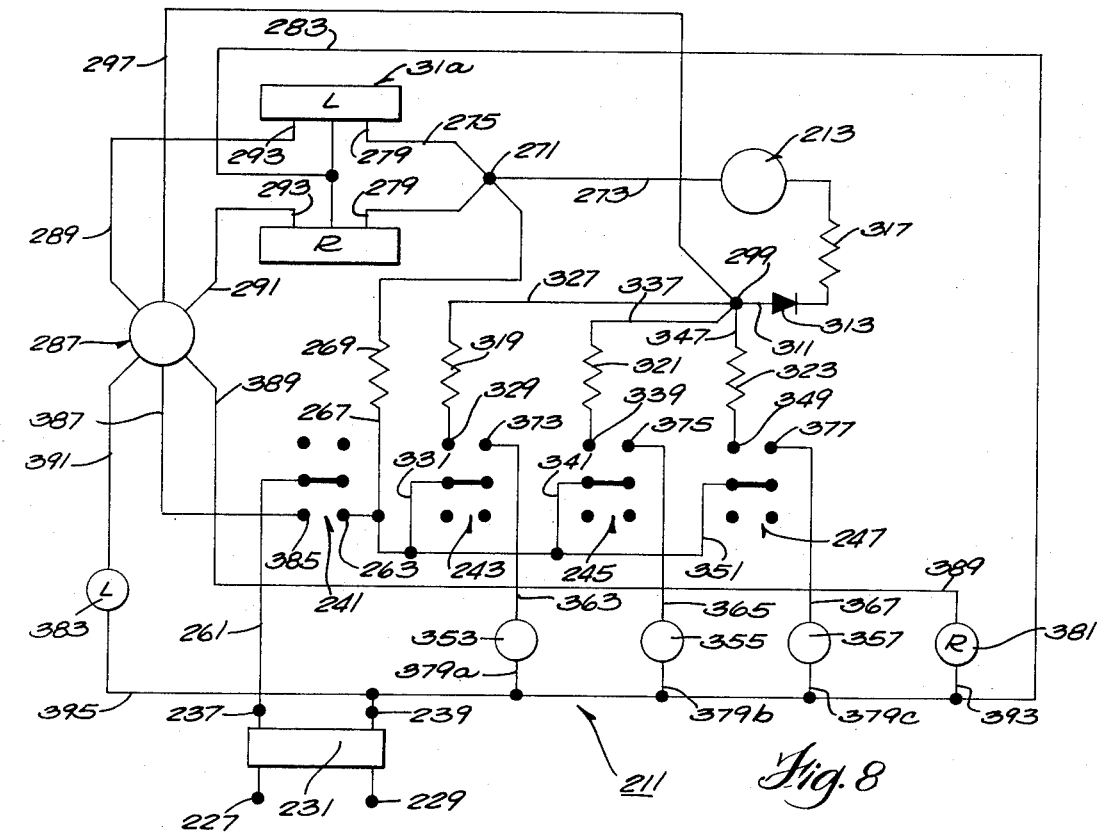
FIG. 8 is a schematic wiring diagram of the circuit embodied in the apparatus shown in FIG. 1.

Shown in the drawings is an aligning apparatus 11 which is in accordance with the invention and which includes, as shown in FIG. 1, a partially illustrated frame, rack, or ramp 13 which, except as otherwise explained herein, is of conventional construction. The frame or rack 13 is adapted to permit an auto to be driven thereon and provides two parallel channels 17 (only one of which is shown) which provide paths for the tires or wheels 19 of the auto. At their forward ends, each of the channels 17 includes a bumper 21 which limits forward movement of the associated front tire 19 and a turntable 23 which supports one of the front wheels and which is swingable about a vertical axis supported in a channel section 27 which is movable transversely of the rack 13.

The invention includes means for supporting, in general alignment with the axis of the associated front wheel 19, a sensing device capable of passing a current which indicates camber, caster, and toe conditions. While various constructions can be employed, in the disclosed construction, the supporting means includes a telescopically extending bracket assembly or tire clamp 33 having generally identical opposed right and left end sections 37 and 39, each section having vertically spaced apart end legs 41 adapted for engaging the outer periphery of the tire 19. The end legs 41 extend from upper and lower cross bars 43 and 47 which are connected by vertical spacing members 49. Located intermediate the right and left end sections 37 and 39 is a center section 51 having hollow upper and lower cross bars 53 and 57 which extend laterally sufficiently to engage the side of the tire and thereby, in general, sense the plane of the tire. The cross bars 53 and 57 are connected by a plate 59 and telescopically receive the hollow cross bars 43 and 47 of the right and left end sections 37 and 39. Extending within the hollow interior of one or both of the upper and lower telescopically connected cross bars is a helical spring 61 which, at its ends, is anchored to the right and left end sections 37 and 39 and which urges the right and left end sections 37 and 39 toward each other and into the center section 51, thereby to increase the telescopic engagement therebetween and to effectively grip the associated wheel 19 and so as to locate the sensing device 31 in general alignment with the wheel axis.

Means are provided for mounting the sensor 31 on the tire clamp 33. While various other arrangements can be employed, in the disclosed construction (See FIG. 3), the plate 59 of the center tire clamp section 51 includes a central aperture through which there extends a shaft or bolt 67 which supports a mounting arm 69 for the sensing device 31. The bolt 67 also passes through a member or block 71 which is located between the plate 59 and the mounting arm 69 and which constitutes a part of a means for calibrating the sensing device 31 for measuring camber.

The mounting arm 69 includes a vertically extending portion 77 having (See FIG. 4) a partially spherically shaped aperture 79 which receives a partially spherical bearing or bushing 81 mounted on the outer end of the shaft 67. Accordingly, the sensor mounting arm 69 is capable of universal movement relative to the plate 59 of the tire clamp 33, including pivotal movement about an axis transverse to the axis of the wheel 19.

Means are provided to rock or pivot the mounting arm 69 relative to the tire clamp plate 59 in order to facilitate the camber measuring operation as is explained in greater detail hereinafter. While various arrangements can be employed, in the disclosed construction, such means includes the before mentioned block 71 which is pivotally mounted on the shaft 67 between the tire clamp plate 59 and the mounting arm 69. Such means also includes, in the block 71, a recess or void 83 which is spaced from the shaft 67 and which opens to the side adjacent the mounting arm 69. Located at least partially in the recess or void 83 is a ball 87 which can be moved axially of the shaft 67 by an adjusting needle 89 threaded through the block 71 and into the recess 83 in the direction generally radially of the shaft 67. At its inner end, the adjusting screw 89 includes a pointed end portion 91 which engages the ball 87 to force the ball 87 outwardly of the void 83 toward the mounting arm 69 in response to inward adjustment of the needle 89 and which, in response to outward adjustment of the needle 89, permits movement of the ball 87 into the void 83.

As will be explained in greater detail hereinafter, in operation, the block 71 is pivoted on the shaft 67 during the camber measuring operation. In order to facilitate such pivotal movement relative to the mounting arm 69 and plate 59, there are provided, in the block 71, several bores 93 extending parallel to the shaft 67. Each bore 93 partially receives a ball bearing 97 and includes a threaded stop 99 which, together with the associated bore 93, defines a ball bearing receiving pocket and which adjustably fixes the depth of the pocket containing the ball bearing 97. As can be seen from FIG. 5, the ball 87 cooperates with the balls 97 to provide 3 point rolling engagement between the block 71 and each of the mounting arm 69 and the clamp plate 59.

The mounting arm adjusting block 71 and related balls 87 and 97 are retained in assembled relation to the tire clamp plate 59 by means which also functions to bias the mounting arm 69 toward the tire clamp plate 59 in such manner as to afford relative movement of the block 71 about the shaft 67 and relative to the plate 59 and universal movement of the mounting arm 69 relative to the plate 59. While various arrangements can be employed, in the disclosed construction, the shaft 67 includes to the right of the plate 59, as shown in FIG. 4, a head 111 and an adjacent washer 113. Located at its other end, i.e., at the end adjacent to the mounting arm 69, the shaft 67 has a lock nut 117. Located between the plate 59 and the washer 113 in surrounding relation to the shaft 67 is a helical spring 119 which serves both to retain the mounting arm 69 and adjustment block 71 in assembled relation to the plate 59 and to cause the ball 87 to move inwardly of the cavity or recess 83 upon withdrawal of the adjusting screw 89.

Mounted on the top of the vertical portion 77 of the sensor mounting arm 69 is a spirit level or bubble 85 which permits locating the mounting arm 69 in a horizontal position transverse to the wheel axis.

Extending from the top of the vertically extending portion 77 of the mounting arm 69 is a horizontally extending bracket or arm portion 121 which supports the sensor 31. In order to facilitate toe condition measurement, the sensor 31 is supported by means affording pivotal movement of the sensor 31 relative to the mounting arm 69 about an axis transverse to the shaft 67. While various arrangements can be employed, in the disclosed construction, such means includes formation of the arm portion 121 with a vertical aperture and a partially cylindrical socket 123 having an axis transverse to the shaft 67. Received in the socket 123 for pivotal movement about the transverse axis is a support member 127 having a head 129 with a bearing surface complementary to the socket 123 and a stem 131 connected to a sensor support or cross bar 133 which carries the sensing device 31.

While various sensing devices can be employed which will cause variation in current flow, as for instance, a variable potentiometer, in the disclosed construction, the sensing device or sensor 31 comprises a conventional transducer including means for variably passing current in accordance with the position of the sensor. In the disclosed construction, such means comprises a vial having three spaced electrodes emersed in an electrolyte fluid so that current is passed from the central electrode to the outer electrodes at varying values depending upon the relation of the vial to the true horizontal.

Extending from the outer end of the arm portion 121 is a vertically extending foot 137 which is apertured to slideably receive a plunger 139 which is located in general alignment with the sensing device 31 and adapted to be axially displaced through the foot 137 so as to rock the sensor support 133 and therefor the sensing device 31 about the transverse sensor pivot and relative to the mounting arm 69. Means are provided for biasing the plunger 139 to a position outwardly of the foot 137 and for limiting outward movement of the plunger 139 so as to prevent separation of the plunger 139 from the foot 137. While various arrangements can be employed, in the disclosed construction, the plunger 139 includes a cross pin 141 which serves as one seat for a spring 143 located in encircling relation to the plunger 139 and between the cross pin 141 and the outer surface of the foot 137.

The means for limiting outward travel of the plunger 139 relative to the foot 137 also serves to adjustably locate the inner end of the plunger so as to establish a horizontal position for the sensor 31 when the sensor mounting arm 69 is horizontal transversely of the wheel axis with the vertical portion 77 in a generally vertical plane transverse to the wheel axis. While various arrangements can be employed, in the disclosed construction, the inner end of the plunger is threaded and a lock nut is adjustably located thereon so as to limit outward plunger movement relative to the foot 137 while, at the same time, so as to cooperate with the spring 143 and with a spring 147 (still to be described) to establish a stop for locating the sensor in horizontal position.

Means are provided for maintaining engagement of the sensor support 133 with the plunger 139 so as to locate the sensor in a horizontal position when the plunger is fully outwardly extended under the influence of the spring 143 and so that any movement imparted to the plunger 139 affects rocking movement of the sensing device 31 relative to the mounting arm 69. While various arrangements can be employed, in the disclosed construction, such means is in the form of a spring 149 connected between the sensor support 133 and the mounting arm 69.

In order to further facilitate toe condition measurement, there extends, outwardly from the mounting arm 69, a stop or member 151 which is adjustably fixed relative to the plunger 139 and sensing device 31 by suitable means (only partially shown at 152). As described later herein in connection with operation of the apparatus, the plunger 139 and stop 151 cooperate with a toe bar 153 (See FIG. 1) to facilitate toe condition measurement.

More specifically, the toe bar 153 extends generally parallel to the channel 17 and is a part of a T-shaped member 157 including a stem 159 which, at its outer end, is pivotally connected, in series, to a pivotally interconnected pair of links 161 and 163 which, in turn, are connected to the ramp or frame 13 by a pivot 167. A similar construction is provided on the side of the ramp 13 (not shown).

In the toe measurement operation, as will be later explained in detail, the toe bar 153 is manually raised upwardly and into engagement with the plunger 139 and the stop 151. The various pivotal connections which connect the toe bar 153 to the frame 13 and which afford pivotal movement of the toe bar 153 relative to the frame 13 into as many positions as may be necessary to accommodate wheels of different types, are such that the various positions of the toe bar 153 are all in parallel relation to one another, to the channels 17, and to the toe bar positions on the opposite side of the frame or ramp 13.

Figure 7:
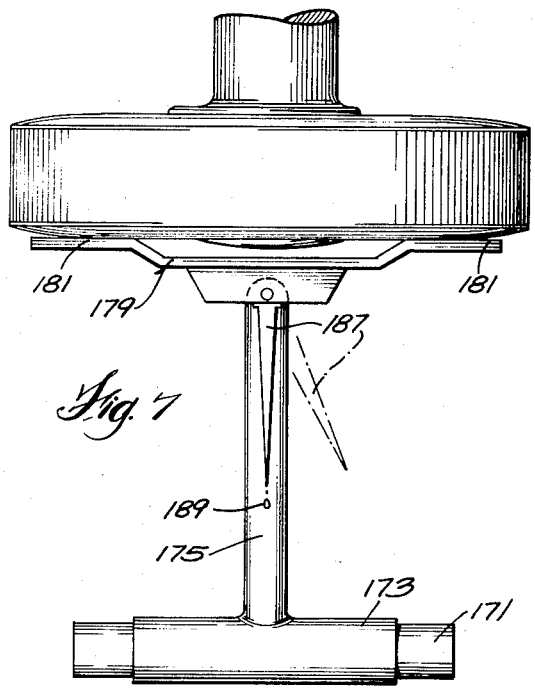
FIG. 7 is a top plan view of a portion of the apparatus which is shown fragmentarily in FIG. 1 and which is employed adjacent to the rear wheel of an automobile.

Also in connection with toe condition measurement, it is desirable that the auto be as parallel as possible to the toe bars 153. In order to facilitate such parallelism, means are provided on the frame 13 for determining the presence or absence of such parallelism. More particularly, as shown in FIG. 7, the frame 13 includes on one side, a pipe or rod 171 which extends parallel to the toe bars 153 and which supports a sleeve 173 which can be adjustably fixed by suitable means (not shown) relative to the rod 171. Extending at a right angle to the sleeve 173 is a support or bar 175 which, at its outer end, has pivotally mounted thereon a yoke or tire engaging member 179 having spaced surfaces 181 adapted for engaging the side surfaces of the associated rear tire 183. Fixed to the tire engaging yoke 179 is a pointer 187 which reflects the angular relation between the tire engaging yoke 179 and the support 175. More specifically, any out-of registry condition between the pointer 187 and a marker 189 on the support 175 indicates that the auto is not parallel with the toe bars 153.

Such parallelism between the automobile and the toe bars 153 can be achieved by simply transversely displacing the front of the car and the supporting transversely movable channel sections 27 so that the auto pivots on its rear wheels until the condition of parallelism is achieved.

The apparatus just described cooperates with and, in part, is included in a circuit means which includes means for measuring current flow from the sensor so as to facilitate camber, caster, and toe measurements. Various modified circuits can be used, which circuits can vary somewhat in accordance with the sensor which is used. In the disclosed construction, the circuit means comprises a circuit 211 (See FIG. 8) which includes a single measuring device 213 capable of measuring camber, caster, and toe conditions. For purposes of convenience so as to facilitate ease of measurement with respect to both left and right front wheels, the apparatus includes two tire clamps 33, one each for the left and right front wheels, with each tire clamp 33 supporting a sensor 31 which is selectively electrically connectable in the circuit 211.

The measuring device 213 is an d-c current meter which is mounted on a control box 217 (See FIG. 1). The measuring device or meter 213 has a pointer 218 and scales 219, 221, and 223 which are respectively associated with each of camber, caster, and toe and which are suitably calibrated.

The circuit 211 is adapted to be energized from current supply means in the form of a standard a-c source of current which includes two terminals 227 and 229 and which can include a regulator (not shown) to insure a more or less uniform voltage. As shown in FIG. 8, the terminals 227 and 229 are connected to a transformer 231 which includes two output terminals 237 and 239 and which serves to reduce standard voltage to a low voltage of approximately 12 volts. However, any low voltage can be employed.

The transformer 231 is connected to switch means for selectively enabling any one of camber, caster, and toe measuring while simultaneously preventing the other measurements. In the disclosed construction, the transformer 231 is connected to a series of mechanically interconnected switches, including an off-on switch 241, a camber switch 243, a caster switch 245, and a toe switch 247. The switches 241, 243, 245, and 247 are, in effect, double pole, double throw switches which respectively include actuating buttons 251, 253, 255, and 257 (See FIG. 1) and which operate when the buttons 251, 253, 255, and 257 are depressed, to connect the center taps of the switches to the upper terminals of the switches as shown in FIG. 8. The switches 241, 243, 245, and 247 are also mechanically interconnected so that when any one of the buttons is depressed the other three buttons are automatically moved to their extended positions. When any of the buttons is in its extended position, the center taps are connected to the lower terminals as shown in FIG. 8. Such switches are conventional and, accordingly, a detailed description of such switches and the automatically operated interconnection is not included herein.

More specifically, the output terminal 237 of the transformer 231 is electrically connected as shown in FIG. 8 by a lead 261 to the center taps of the off-on switch 241. Connected to one lower terminal 263 of the off-on switch 241 is a lead 267 which, in turn, is connected through a resistance 269 to a terminal 271. In turn, the terminal 271 is connected by a lead 273 to one terminal of the d-c current meter 213. The terminal 271 is also connected by separate leads 275 and 277 to the outer electrodes 279 of each of a left and right wheel transducer 31a and 31b respectively, which transducers have been previously referred to by the numeral 31. The center electrodes 281 of each of the left and right wheel transducers 31a and 31b respectively, are, in turn, connected by a common lead to the transformer output terminal 239.

The circuit 211 also includes means for selectively and alternatively electrically including in the current either the left or right wheel transducers 31a and 31b respectively. While various switching arrangements can be employed, in the disclosed construction, such means includes a rotary double pole, double throw switch 287 (See FIGS. 1 and 8) which is mounted on the control box 217 and which has the opposite terminals of one pole connected by respective leads 289 and 291 to the other outer electrodes 293 of the respective transducers 31a and 31b respectively. The center tap of said one pole is therefor selectively connectable with either the left or right transducer 31a and 31b respectively, and is connected by a lead 297 to a terminal 299.

In turn, the terminal 299 is connected by a lead 311 through a diode 313 and a resistance 317 to the other terminal of the d-c current meter 213.

Means including the before mentioned switch means 243, 245, and 247 are also provided in the circuit 211 for also connecting selectively the just mentioned terminal 299 with the lower terminal 263 of the off-on switch 241 through a camber resistor 319, a caster resistor 321, and a toe resistor 323.

More specifically, the terminal 299 is connectable by a lead 327 through the camber resistor 319 to an upper terminal 329 of the camber switch 243. The center taps of the camber switch 243 are connected by a common lead 331 to the lower terminal 263 of the off-on switch 241. Thus, whenever the camber switch 243 is depressed, current flows from the bottom terminal 263 of the off-on switch 241 through the camber switch 243 and through the lead 327 and resistor 319 to the terminal 299.

The terminal 299 is also connectable by a lead 337 through the caster resistor 321 to an upper terminal 339 of the caster switch 245. The center taps of the caster switch 245 are connected by a common lead 341 to the lower terminal 263 of the off-on switch 241. Thus, whenever the caster switch 245 is depressed, current flows from the bottom terminal 263 of the off-on switch 241 through the caster switch 245 and through the lead 337 and resistor 321 to the terminal 299. It should be noted that the caster resistor 321 is a variable resistor having means including a knob 343 which is located on the control box 217 and which is operable by the operator for variably adjusting the resistance of the resistor 321, as will be explained.

Still further, the terminal 299 is also connectable by a lead 347 through the toe resistor 323 to an upper terminal 349 of the toe switch 247. The center taps of the toe switch 247 are connected through a common lead 351 to the bottom terminal 263 of the off-on switch 241. Thus, whenever the toe switch 247 is depressed, current flows from the bottom terminal 263 of the off-on switch 241 through the toe switch 247 and through the lead 347 and toe resistor 323 to the terminal 299.

It should be noted that whenever one of the caster, camber, or toe switches 243, 245, and 247, respectively, is depressed, all of the other switches 241, 243, 245, and 247 are automatically displaced to their extended positions, thus making connection between the bottom terminals 263 of the off-on switch 241 and the transformer 231 and breaking the electrical connection with the resistors associated with the switches which are in their extended positions.

The control box 217 also includes means for indicating which of the caster, camber, or toe buttons 253, 255, and 257 is depressed and for indicating whether the left or right transducer 31a and 31b has been placed in the circuit 211 by the rotary switch 287. More particularly, in accordance with the invention, the control box 217 is provided with a camber light 353, a caster light 355, and a toe light 357 which are respectively energized when the caster, camber, or toe buttons 253, 255, and 247 are depressed so as to indicate that the circuit is connected for use in accordance with the button which has been depressed. More particularly, the caster, camber, and toe lights 353, 355, and 357 are respectively connected by leads 363, 365, and 367 to upper terminals 373, 375, and 377 of the camber, caster, and toe switches 243, 245, and 247, and are connected by leads 379a, 379b, and 379c to the output terminal 239 of the transformer 231.

Accordingly, when any one of the caster, camber, or toe switches 243, 245, and 247 is depressed, current flows through the off-on switch 241 and to the center tap of the depressed switch. From the center tap, current flows through the upper terminal and through the indicating light to the terminal 239 of the transformer.

It is noted that when one of the camber, caster, and toe switches 243, 245, and 247 is depressed, the lights associated with the other two functions are not illuminated as the other two switches are in their extended position and the associated lighting circuit is open.

In addition, the control box 217 includes right and left lights 381 and 383 respectively which are respectively illuminated in accordance with the setting of the rotary switch 287 connected to the right and left transducers 31a and 31b. In this regard, the lower terminal 385 of the off-on switch 241 is connected by a lead 387 to the center tap of the other pole of the rotary switch 287. The two end terminals of the other pole of the rotary switch 287 are respectively connected by leads 389 and 391 to the right and left indicating lights 381 and 383, respectively. The rotary switch 287 is arranged so that the center tap is connected to the left light 383 when the left transducer 31a is connected in the measuring circuit 211 and so that the right light 381 is connected to the center tap when the right transducer 31b is connected in the measuring circuit 211. In turn, the right and left lights 381 and 383 are connected by respective leads 393 and 395 to the terminal 239 of the transformer 231. Thus, the right and left lights 381 and 383 will be illuminated only upon depression of one of the caster, camber, and toe buttons 353, 355, and 357 to complete a circuit through the off-on switch 241 and in such manner as to reflect which of the left and right transducers 31a and 31b respectively has been electrically connected by the rotary switch 287 into the measuring circuit 211.

In operation, an automobile is first driven onto the ramp 13 so that its front tires 19 are located on the turntable 23. A tire clamp or bracket assembly 33 is then mounted on each of the front tires 19 with the transducer 31 in general alignment with the wheel axle. If the car is not parallel to the toe bars 153, the car can be placed in such parallel condition, as later explained, either at this point or immediately prior to the toe condition measurement. The rotary switch 287 is then set for left or right as appropriate. As it is preferred to initially measure and make whatever camber adjustments as may be necessary, the camber button 253 on the control box 217 is depressed to connect the camber resistance 319 into the circuit 211 and to light the camber light 353, as well as the left or right light 381 and 383 in accordance with the setting of the rotary switch 287.

The next step in camber condition measurement is to establish the transducer 31 in a horizontal condition which will effect a zero camber reading at the middle of the scale 219 on the meter 213. This is accomplished by adjusting the screw 89 extending from the block 71 either in or out to laterally affect the position of the ball 87 either to the left or right as shown in FIG. 4 and to thereby move the transducer mounting arm 69 about the spherical bearing 81 (i.e., also about an axis transverse to the shaft 67 or wheel axis) so as to locate the transducer 31 in horizontal position. This adjustment is effectively the same as removing whatever "out of camber" condition may exist. In order to measure camber, the block is then rotated through 180° with the result that the ball 87 causes tilting of the transducer mounting arm 69 in the opposite direction from its immediately preceding position to reflect the true camber condition of the wheel 19. A reading of that condition can be observed on the camber scale 219 of the meter 213. Corrections can then be made as necessary to the mounting of the wheel 19 to the A frame in order to achieve a camber reading which is in accordance with the manufacturers recommendations. Each reading should commence with the block 71 positioned with the adjusting screw 89 extending upwardly and with the proper adjustment so as to provide a zero reading on the camber scale 219 on the meter 213.

In order to measure caster, the block 71 is returned to its initial position with the screw 89 extending upwardly and the wheel 19 is turned in 20° from the forward track. The caster button 255 is then pushed or depressed and the caster resistor knob 343 is operated to obtain a zero reading on the caster scale 221 of the meter 213. The wheel 19 is then turned through 40° until it is 20° out from its forward track and a reading is taken on the caster scale 221. If the reading is not within the tolerances recommended by the automobile manufacturer, adjustments to the connection between the wheel 19 and the A frame are made and the caster measuring procedure is repeated.

It is desirable to complete the camber and caster measurements and adjustments to both front wheels before proceeding with the toe measurements.

In the camber and caster measuring procedures, the sensor or transducer 31 is stationary relative to the mounting arm 69 and the measurement involves movement of the mounting arm to cause movement of the sensor 31 relative to a pre-selected condition. Contrariwise, operation of the disclosed apparatus to measure toe involves the tiltability of the sensor or transducer 31 about its transverse pivotal connection to the transducer mounting arm 69.

Preliminary to the actual toe measurement, the automobile is shifted on the ramp so as to approximately align as near as possible the front and rear wheels parallel to the toe bars 153. In this regard, the front of the automobile can be displaced transversely so as to line up the pointer 187 with the marker 189 on the rear wheel rod or support 175. In effect, this operation serves to locate the front wheels in a plane which contains both front and rear wheels and which, as near as possible before adjustment, is parallel to the toe bars 153, thereby to facilitate toe condition measurement.

After properly locating the car on the ramp 13, the toe button 257 is pressed and one of the toe bars 153 is swung upwardly to engage and inwardly displace the associated plunger 139 until engagement by the toe bar 153 with the stop 151. Inward movement of the plunger 139 relative to the foot 137 causes displacement of the transducer 31 about its cross pivot. The stop 151 is preset so that it extends relative to the foot 137 and therefor relative to the plunger 139 and the transducer 31 so that the meter 213 will read zero on the toe scale 223, i.e., the pointer 218 will be in an upright position, when there is no "out-of-toe" condition. However, should there be an out-of-toe condition, depression of the plunger 139 by the toe bar 153 will cause such tilting of the transducer about its transverse pivotal axis by an amount which is either more or less than the amount necessary to provide a zero reading. Such movement will be reflected by the location of the pointer 218 with respect to the toe scale 223 on the meter 213. If the meter reading is outside of the tolerances recommended by the automobile manufacturer, adjustments can be made to the connection between the wheel support and the A frame. The toe measuring procedure can then be repeated until the toe condition is within the prescribed tolerances. After one front wheel has been adjusted to provide proper toe, the other front wheel is then similarly adjusted.

It should also be noted that depression of the off-on switch button 251 serves to open the circuit 211 and to extend the other buttons 253, 255, and 257.

It should be understood that while the circuit 211 includes provision for two transducers 31 generating outputs which are selectively measured by a single meter 213, the use of two transducers is only for convenience and a single tire clamp with a single associated transducer could be used for both front tires.

Shown in FIGS. 9, 10, and 11 is another embodiment of a portion of the apparatus already described. More specifically, the apparatus shown in FIGS. 9, 10, and 11 is adapted to be substituted for the previously described sensor mounting arm 69 and its associated components.

More particularly, the apparatus shown in FIGS. 9, 10, and 11 comprises a sensor mounting arm 569 and a connected cover 570 which serves generally to protect the working components of the apparatus.

The sensor mounting arm 569 is carried on the end of the shaft 67, in like manner to the sensor mounting arm 69 previously disclosed, and includes a vertically extending portion 577. Means are provided on the sensor mounting arm 569 for locating the mounting arm in a horizontal position in a plane perpendicular to the wheel axis or, i.e., to the shaft 67. While other arrangements can be employed, in the disclosed construction, such means comprises a spirit level or bubble 585 mounted on the top edge of the vertical portion 577 of the sensor mounting arm 569 in position to be viewed, notwithstanding assembly of the cover 570 on the sensor mounting arm 569.

Incorporated on the sensor mounting arm 569 is means for supporting a sensor 531 (such as the transducer 31 already described) for pivotal movement about an axis perpendicular to the wheel axis, i.e., to the shaft axis 67. While various arrangements can be employed, in the disclosed construction, the transducer 531 is carried by a lower cross bar 533 of an inverted T-shaped support member 527 which also includes an upwardly extending stem 531. The pivotal mounting means further comprises (See FIG. 11) a slot 572 in a bracket or arm 621 extending from the vertical portion 577 of the sensor mounting arm 569 and a stud or pin 574 which is supported in the bracket 621 and extends through the stem 531 to afford pivotal movement of the sensor support member 527 and associated sensor 531 about an axis perpendicular to the wheel axis.

Means are provided for engaging the sensor support member 527 so as to adjustably locate the transducer 531 in a horizontal position generally parallel to the wheel axis when the vertical portion 577 of the sensor mounting arm 569 is located in a vertical plane and the spirit level or bubble 585 indicates a horizontal position in the vertical plane.

While various arrangements can be employed, in the disclosed construction, the bracket 621 includes a boss 576 located on the side of the slot 572 remote from the vertical portion 577 of the sensor mounting arm 569. Extending generally parallel to the wheel axis in the boss 576 is a threaded aperture 578 which receives a set screw or stop 580 with an end 582 engageable with the stem 531 above the pin 574. The set screw 580 can be releasably locked in a position determining the horizontal location of the sensor 531 by a lock nut 584 or other suitable means. As the screw 580 just described is provided to accommodate manufacturing tolerances, it is contemplated that this adjustment will be made only at the factory.

In order to facilitate camber measurements, means are provided for biasing the sensor support member 527 into engagement with the screw or stop 580 and thereby to locate the sensor 531 in a horizontal position when the vertical portion 577 of the sensor mounting arm 569 is both vertical and horizontal as already mentioned. While various arrangements can be employed, in the disclosed construction, such means is in the form of a tension spring 649 connected between the vertical supporting arm portion 577 and the stem 531 of the sensor support member 527 at a point below the stud or pin 574.

In connection with toe measurements, the apparatus shown in FIGS. 9, 10, and 11 includes, as in the previously disclosed embodiment (See FIG. 9), a stop 651 which is threaded into the vertical portion 577 of the sensor mounting arm 569 and which extends in generally parallel relation to the wheel axis. The stop 651 is axially adjustable relative to the sensor mounting arm 569 by a lock nut 586.

In order to permit engagement of the stop 651 with the toe bar 153 during toe measuring operations, the cover 570 is apertured at 588 and the stop 651 projects freely through the aperture 588 and outwardly beyond the cover 570. In order to prevent damage to the stop 651 at times other than when taking toe measurements, the aperture 588 is dimensioned considerably larger than the diameter of the stop 651 and is threaded to receive a knob 590 having an externally threaded hub 592. Extending inwardly of the end of the hub 592 is an axial bore 594 which houses the projecting end of the stop 651 when the knob 590 is threaded on the cover 570.

Also as in the previously disclosed embodiment, the toe measuring components include a plunger 639 which is engageable with the sensor support member 527 to pivot the sensor in accordance with the engagement of the plunger 639 with the toe bar 153. More specifically, in the embodiment shown in FIGS. 9, 10, and 11, the plunger 639 is received (See FIG. 11) in a bore 596 which extends generally parallel to the wheel axis and which is located in an offset portion 598 of a fixed leg 600 extending from the vertical portion 577 of the sensor support arm 569 on the side of the sensor support 527 remote from the stop 651. The plunger 639 extends from the bore 596 outwardly (See FIG. 11) through an aperture 602 in the cover 570. In order to prevent damage to the plunger 639 and its associated components at times other than when taking toe measurements, the aperture 602 is dimensioned considerably larger than the diameter of the plunger 639 and is threaded to receive a knob 604 having an externally threaded hub 606. Extending inwardly of the end of the hub 606 is an axial bore 608 which receives the projecting end of the plunger 639 when the knob 604 is threaded on the cover 570.

In order to afford engagement of the sensor support member 527 by the plunger 639, the sensor support member 527 includes, at its inner or rearward end, a leg 610 which extends between the vertical portion 677 of the sensor mounting arm 569 and an inner end 612 of the offset leg portion 598 and which includes an L- shaped slot 614 receiving the inner end of the plunger 639.

In order to afford engagement between the plunger 639 and the sensor support leg 610, the inner end of the plunger 639 is threaded and includes an adjustably located nut 616 which is located between the vertical portion 677 of the sensor support arm 569 and adjacent surface 618 of the sensor support leg 610 and which is sufficiently large to span the slot 616 and engage the surface 618 of the sensor support leg 610. The nut 616 can be locked in adjusted position by a locking nut 620.

When the apparatus is employed for the purpose of taking toe measurement, the plunger 693 is biased outwardly or away from the vertical portion 677 of the sensor mounting arm 639 by a spring 643 which circles the plunger 639 and is seated, at one end, against the outer end of the offset leg portion 598 and, at its other end, against a cross bar 622 extending from the plunger 639. The spring 643 is fabricated so as to overcome the bias of the previously mentioned spring 649 and to urge the plunger 639 outwardly to thereby pivot the sensor support member 527 until the sensor support leg 610 engages the back or rearward end 612 of the offset leg portion 598. With the components in such position, the plunger 639 extends through the previously mentioned aperture 602 and outwardly beyond the stop 651 in position for engagement with the toe bar 153. Movement of the toe bar 153 against the plunger 639 displaces the plunger 639 inwardly, thereby overpowering the spring 643 and permitting the spring 649 to rock the sensor support member 527 in the clockwise direction as shown in FIG. 11 in accordance with the amount of inward movement of the plunger 639 afforded by engagement with the toe bar 153.

In order to de-activate the overpowering action of the spring 643 with respect to the spring 649 and thereby enable camber and caster measuring operations independently of the influence of the spring 643, the axial extent of the bore 608 in the knob 604 is dimensioned so that, incident to initial threading of the knob 604 into the cover 570, the projecting end of the plunger 639 is seated against the end of the bore 608 and so that, incident to the continued threading of the knob 604 into the cover 570, the plunger 639 is displaced inwardly until the nut 614 moves to a position spaced remotely from the back surface 618 of the sensor support leg 610, thereby rendering the sensor support member 527 free of the influence of the plunger spring 643. Under these circumstances, the sensor support member 527 will be biased by the spring 649 into engagement with the previously mentioned stop 580.

Figure 6:
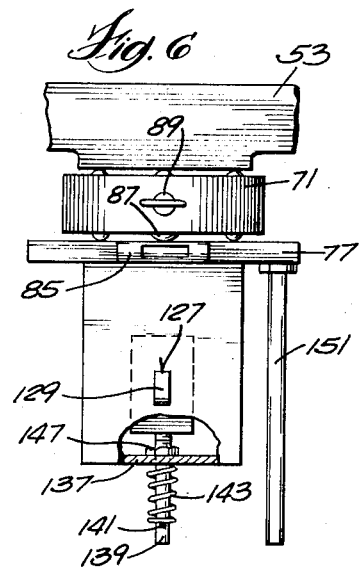
FIG. 6 is an enlarged top view of the portion of the device shown in FIG. 3.

In general, the operation of the device shown in FIGS. 9, 10, and 11 is substantially the same as that of the device shown in FIGS. 3 and 6 with the exception that the knob 604 which depresses the plunger 639 inwardly must be in its fully threaded position in the cover 570 during the camber and caster operations and except that both knobs 590 and 604 are removed during the toe measuring operation.

From the foregoing, it can be readily observed that there is provided a relatively simple apparatus which is relatively simple to manufacture and operate and which will reliably and effectively provide the necessary measurements which are part of a front wheel alignment procedure.

It should again be noted that the disclosed apparatus facilitates alignment of both front and rear wheels. This is particularly important in connection with automobiles which require alignment of the rear wheels, as well as of the front wheels.

Various of the features of the invention are set forth in the following claims.

What is claimed is:

1. Aligning apparatus for selectively measuring camber, toe, and caster including means adapted to be connected to a wheel, and a measuring circuit including a sensor movably mounted on said means to positions responding to the camber, caster, and toe conditions of the wheel, said sensor including means for variably passing current to produce an output signal in accordance with the position of said sensor, means for supplying alternating current voltage to said circuit, means in said circuit for measuring the output signal from said sensor, a camber resistor, a caster resistor in parallel electrical connection with said camber resistor, a toe resistor in parallel electrical connection with said camber resistor and said caster resistor, and switch means connected with said camber, cater, and toe resistors for selectively connecting any one of said camber, caster, and toe resistors in operative electrical connection with said sensor and for simultaneously disconnecting the other two of said camber, caster, and toe resistors from said sensor.

2. Aligning apparatus in accordance with claim 1 including a second means adapted to be mounted on another wheel and wherein said circuit includes a second sensor movably mounted on said second means to positions responding to the camber, castor, and toe conditions of the other wheel and a second switch means for effecting alternate electrical connection of one of said first mentioned and second sensors in said circuit.

3. Aligning apparatus in accordance with claim 2 including first and second indicating lights respectively associated with said first mentioned and second sensors and wherein said second switch means includes means for selectively illuminating said first and second lights in accordance with the connection of said first mentioned and second sensors in said circuit.

4. Aligning apparatus in accordance with claim 1 including a camber light, a caster light, and a toe light and wherein said first mentioned switch means includes a camber switch, a caster switch, and a toe switch and wherein said first mentioned switch means includes means operable upon connection of any one of said caster, camber, or toe resistors in said circuit to selectively illuminate the associated one of said camber, caster, and toe lights.

5. Aligning apparatus in accordance with claim 4 including a second means adapted to be mounted on another wheel and wherein said circuit includes a second sensor movably mounted on said second means to positions responding to the camber, caster, and toe conditions of the other wheel, and a second switch means for effecting alternate electrical connection of one of said first mentioned and second sensors in said circuit.

6. Aligning apparatus in accordance with claim 5 including first and second indicating lights respectively associated with said first mentioned and second sensors and wherein said second switch means includes means for selectively illuminating said first and second lights in accordance with the connection of said first mentioned and second sensors in said circuit.

7. Aligning apparatus in accordance with claim 6 wherein said first mentioned switch means also includes an off-on switch connected to said second switch means for affording current flow to said second switch means and wherein said first mentioned switch means includes means operable, upon actuation of any one of said camber, caster, and toe switches, to electrically connect the associated one of said resistors in said circuit, to close said off-on switch to energize said circuit, to illuminate one of said first and second lights in accordance with the operation of said second switch means, and to illuminate the associated one of said camber, caster, and toe lights.

8. Aligning apparatus in accordance with claim 1 wherein said caster resistor includes manually operable means for varying the resistance of said resistor.

9. Aligning apparatus in accordance with claim 1 wherein said sensor comprises a transducer including a sealed cavity containing an electrolyte fluid, a center electrode, and two outer electrodes spaced from said center electrode, and wherein said measuring device is an d-c current meter in series connection with the parallel electrical connection of said camber, caster, and toe resistors.

10. Aligning apparatus in accordance with claim 9 including a diode and a resistance electrically connected in series with said meter and with the parallel electrical connection of said camber, caster, and toe resistors, and further including a second resistance in parallel relation to the series connection between said meter and the parallel electrical connection of said camber, caster, and toe resistors.

11. Aligning apparatus in accordance with claim 10 wherein one of said outer transducer electrodes is electrically connected in series with said first resistance and said meter and wherein said center transducer electrode is electrically connected to said means for supplying alternating current, and said other outer transducer electrode is connected to the series connection between said meter and the parallel electrical connection of said camber, caster, and toe resistors.

12. Wheel aligning apparatus including a clamp adapted to be connected to a wheel, a mounting arm, means for supporting said mounting arm from said clamp for pivotal movement of said mounting arm relative to said clamp about an axis transverse to the wheel axis, an electrical sensor including means for variably passing current to produce an output signal in accordance with the position of said sensor, and means supporting said sensor from said mounting arm for movement with said mounting arm and for rocking movement of such sensor relative to said mounting arm about another axis transverse to the axis of the wheel in response to the action of gravity.

13. Aligning apparatus in accordance with claim 12 including a block and means mounting said block from said clamp and adjacent to said mounting arm and for pivotal movement of said block relative to said clamp about an axis generally parallel to the wheel axis.

14. Aligning apparatus in accordance with claim 13 including means on said block for adjustably displacing said mounting arm about said first-mentioned transverse axis.

15. Aligning apparatus in accordance with claim 14 wherein said means for adjustably displacing said mounting arm about said first-mentioned transverse axis comprises a void in said block open adjacent to said mounting arm, a ball at least partially located in said block and bearing against said mounting arm, and means for effecting movement of said ball toward said mounting arm and permitting movement of said ball from said mounting arm.

16. Aligning apparatus in accordance with claim 15 wherein said means for effecting and permitting movement of said ball includes an adjusting screw threadably received in said block for movement in a radial path relative to the block pivot axis and having a pointed end portion extending into said void.

17. Aligning apparatus in accordance with claim 16 wherein said means connecting said mounting arm and said clamp affords movement of said arm toward and away from said clamp and further including means biasing said mounting arm toward said clamp.

18. Aligning apparatus in accordance with claim 12 including a support member to which said sensor is mounted, and wherein said mounting arm includes an arm portion, and means connecting said arm portion and said support member for affording pivotal movement of said support member and said attached sensor about about said second-mentioned axis transverse to the axis of the wheel.

19. Aligning apparatus in accordance with claim 18 wherein said mounting arm further includes a foot and further including a plunger, means movably mounting said plunger on said foot for movement perpendicularly to said second mentioned transverse axis and for engagement with said support member to pivot said sensor about said second mentioned transverse axis, means biasing said support member into engagement with said plunger, and a stop member mounted on one of said mounting arm and said clamp and extending perpendicularly to said second mentioned transverse axis.

20. Aligning apparatus in accordance with claim 19 and further including a frame upon which the wheel is supported, a toe bar, and means pivotally mounting said toe bar to said frame for movement into a position in engagement with said stop member and said plunger.

21. A wheel aligning apparatus in accordance with claim 12 wherein said clamp includes a pair of telescopically related sections each having first portions adapted to engage the side of a tire mounted on the wheel and end portions adapted to engage the circular periphery of the tire and means biasing said sections toward one another to grip the tire between the end portions.

22. Wheel aligning apparatus in accordance with claim 12 wherein said another axis is spaced from said sensor.

* * * * *